Feb. 24, 1948.   A. G. OBLAD   2,436,698
PROCESS FOR SEPARATING OLEFINS FROM HYDROCARBON MIXTURES
Filed April 16, 1945
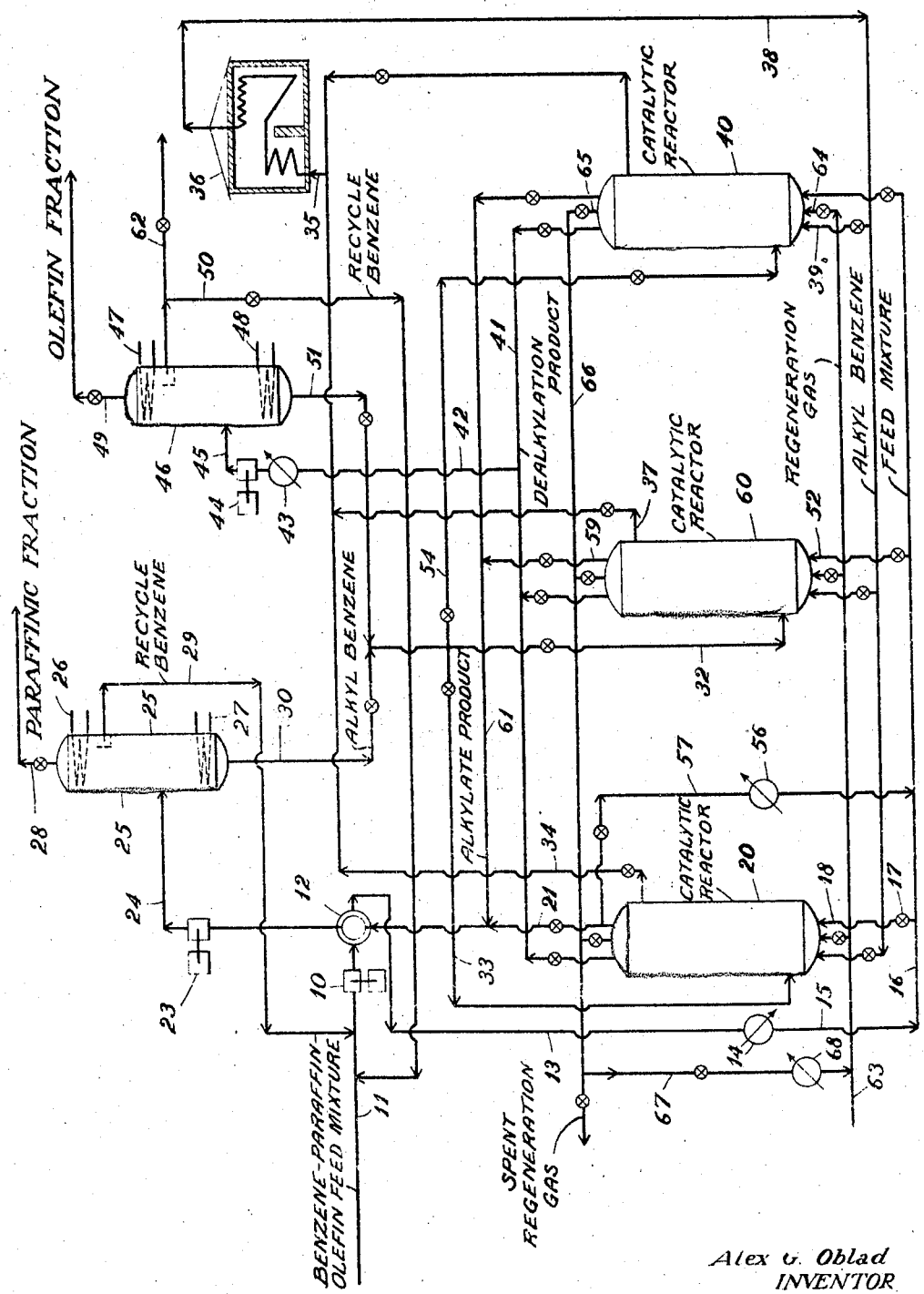
Alex G. Oblad
INVENTOR
BY John C. Stauffer
ATTORNEY Patented Feb. 24, 1948

2,436,698

UNITED STATES PATENT OFFICE 2,436,698

PROCESS FOR SEPARATING OLEFINS FROM HYDROCARBON MIXTURES

Alex G. Oblad, Dallas, Tex., assignor, by mesne assignments, to Socony-Vacuum Oil Company, Incorporated, New York, N. Y., a corporation of New York Application April 16, 1945, Serial No. 588,552

1 Claim. (Cl. 260—671)

This invention relates to the separation of olefins from paraffins. More particularly this invention relates to a method for the separation of a close boiling fraction of low boiling hydrocarbons containing paraffins and olefins into relatively pure independent streams of these classes of hydrocarbons which separation cannot be accomplished successfully by conventional methods such as by fractionation or by solvent extraction.

With the development and use of many valuable new products such as resins, synthetic rubber and other polymeric forms of olefins, it becomes highly desirable to produce low boiling olefins in a purified state as feed material to hydrocarbon synthesis processes. A common and abundant source of these olefins is in the effluent gases from the thermal and catalytic cracking of petroleum oils. However, the olefins are present in such gases admixed with paraffinic gases and hence the gas must be fractionated to separate cuts containing hydrocarbons of the same number of carbon atoms to the molecule desired in the feed to the synthetic process. Heretofore, these close cuts have been subjected to more or less conventional methods of separation such as by solvent extraction, extractive distillation or even chemical methods to separate the paraffinic hydrocarbons from the olefinic hydrocarbons. Since the olefins particularly the $C_3$ and $C_4$ olefins boil very closely to the corresponding paraffins, ordinary distillative fractionation methods are inadequate to produce an olefin stream of the desired purity. Solvent extraction and extractive distillation only partially solve the problem since the selectivity of known solvents for olefins is not sufficient to produce an olefinic extract of high purity. Known chemical methods are generally unsatisfactory from the standpoint of yield or operating cost.

It is an object of this invention to prepare relatively pure olefins as feed material for such hydrocarbon synthesis processes as polymerization and alkylation. Another object of the invention is to provide a method for separation of olefins from paraffins in a narrow fraction of a cracked petroleum gas stream. Still another object of the invention is to separate a mixture of close boiling paraffins and olefins to obtain from such mixture an olefin or mixture of olefins containing less than 5 per cent of non-olefinic hydrocarbons. Other objects of the invention will be apparent from the description thereof which should be read in conjunction with the drawing and the appended claims.

The method of the present invention involves a simple process of catalytic alkylation of aromatics by the olefins in the paraffin-olefin mixture, fractionation of the alkylate to remove therefrom non-alkylated paraffins, catalytic dealkylation of the alkyl aromatics and fractionation of the dealkylated product to produce a relatively pure stream of the regenerated olefins and a stream of aromatics for recycle to the alkylation step. Examples of hydrocarbons which can be separated by my process are mixtures of propylene and propane, of butanes and butenes and of pentanes and pentenes.

My process utilizes hydrocarbons only, namely aromatics such as benzene or toluene as the reactant whereby olefins are converted to products which boil at temperatures remote from the boiling temperatures of the closely associated paraffins of the paraffin-olefin fraction to be separated.

In my process a stream containing paraffins and olefins such as butanes and butenes is mixed with from one to twenty parts of an aromatic hydrocarbon such as benzene, and the liquid mixture is passed over an alkylation catalyst at alkylation temperatures to form the alkyl benzene. The reaction mixture is then passed to a fractionating tower for separation of an overhead fraction of unreacted paraffins from unreacted benzene which is withdrawn as a side stream and from the alkyl benzene which is removed as a bottom product. This alkyl benzene bottom product is heated to conversion temperature and passed over a dealkylation catalyst which may be the catalyst used in the alkylation step where it has become partially spent relative to alkylation activity or it may consist of a different catalyst. In my preferred method of operation the dealkylation catalyst and the alkylation catalyst consist of essentially the same catalytic material. If desired freshly regenerated catalyst may be used first for dealkylating the alkyl aromatics and then for alkylation since there is little tendency to deposit carbon on the catalyst in the dealkylation step.

The product from the dealkylation step is passed to a second fractionating tower whence the normally gaseous olefins in high purity, i. e., higher than 95 per cent, are taken overhead, and unconverted aromatics are recycled to the dealkylation step. Benzene or other aromatics formed in the dealkylation step, if any, such as toluene, are recycled to the alkylation step. In general, I prefer to operate the dealkylation step at conditions of temperature and contact time such that no more than 75 per cent of the alkyl aromatics are dealkylated per pass through the dealkylation catalyst bed since a purer stream of the desired olefin and recycle dealkylated aromatics are obtainable as a result of almost complete absence of side reactions when complete conversion of the alkyl aromatics in a single pass is avoided.

I prefer to use alumina activated silica catalysts in the dealkylation step. These may be prepared by any of the methods well known to those skilled in the art of catalytic hydrocarbon conversion. Suitable silica-alumina catalysts containing from 80 per cent up to 98 per cent or 99 per cent silica may be prepared by coprecipitation of silica gel and alumina or by impregnating silica gel with a solution of an appropriate aluminum salt to form the alumina activated silica gel. The mixed oxides are dried and activated by heat treatment for several hours at temperatures up to 200° C. prior to use.

The above catalysts are used in the dealkylation of the alkyl aromatics in my process at temperatures within the range of from about 350° C. to about 550° C. I prefer to use the silica-alumina catalyst at temperatures within the range of from about 475° C. to about 550° C. when operating at space velocities within the range of from about 5 to 20 volumes of alkyl aromatics (liquid basis) per volume of catalyst space per hour. If desired, somewhat lower temperatures may be used, i. e., from about 400° C. to 500° C., at space velocities of from 0.2 to 5 volumes of alkyl aromatics (liquid basis) per volume of catalyst space per hour.

The above catalysts may also be used in the alkylation step of my process at lower temperatures and generally higher space velocities. Thus, the silica-alumina type catalyst may be used to alkylate the aromatics with the olefins at temperatures within the range of from about 175° C. to 300° C., at space velocities within the range of from about 1 to 10 volumes of mixed olefins and aromatics (liquid basis) per hour while temperatures up to 350° C. or 400° C. may be used if space velocities from 10 up to 50 volumes of feed per volume of catalyst space per hour are used in vapor phase operation. When operating my process to store exothermic heat of alkylation in the catalyst bed, as described below, after the catalyst has lost appreciable alkylation activity the temperature of operation of the alkylation step is higher than the maxima of the above ranges. Thus, a maximum of 400° C. for normal operation in the alkylation step would be increased to 425° C. or even 450° C. in order to store heat in the catalyst and thereby lower the heat duty of furnace 36 in preheating alkylate prior to the dealkylation step.

Catalysts other than the above may be used for the alkylation step of my process. Thus, Friedel-Crafts type catalysts such as anhydrous hydrogen fluoride, hydrogen halide promoted aluminum halide or $H_3PO_4$ impregnated alumina and $H_3PO_4$ impregnated kieselguhr may be used in the alkylation step. I prefer to use silica-alumina catalyst in the alkylation step since this catalyst may also be used in the dealkylation step after being partially spent with respect to alkylation activity or vice versa may be used in the alkylation step after use in the dealkylation step. However, I do not wish to limit my invention to the use of any specific alkylation catalyst or any specific dealkylation catalyst, and I do not wish to be limited to the use of the same catalyst in these two steps of my process.

The alkylation step of my process may be carried out in either liquid phase or vapor phase at pressures within the range of from 100 to 1500 pounds gage although I prefer to operate in vapor phase using the alumina-silica catalyst at relatively high temperature and high space velocity. The dealkylation step is carried out in the vapor phase at pressures from atmospheric up to fifty pounds gage.

Referring now to the drawing, which is a diagrammatic illustration of one method of carrying out the process of my invention, a mixture of benzene and a closely fractionated $C_4$ cut from cracked gasoline containing n-butane, isobutane, butene-2, butene-1 and isobutene, the ratio of benzene to $C_4$ hydrocarbons in said mixture being at least 1 to 1, is passed by means of pump 10 through line 11, heat exchanger 12 and line 13 to heat supply means 14 where the mixture is heated to a temperature of about 250° C. The heated mixture is then passed via line 15 to manifold line 16 and thence through valve 17 in line 18 to alkylation reactor 20 at a pressure of about 300 pounds per square inch.

Reactors 20, 40, and 60 are stationary bed reactors of the heat exchanger type the tubes of which are packed with alumina-silica catalyst of the hereinabove described coprecipitate type. These reactors, which may alternatively consist of towers containing catalyst in a continuous bed or towers containing catalyst disposed on a series of trays, are alternately put on the alkylation cycle, on the dealkylation cycle, and on the catalyst regeneration cycle of the process. As the mixed reactants pass upward through the catalyst in tower 20 at least a part of the benzene is alkylated with the olefins of the cracked fraction and the product stream flows through line 21 and heat exchanger 12 and the liquid product is passed by means of pump 23 through line 24 to alkylate fractionator 25. The conversion of benzene to alkylated benzene is an exothermic reaction, and hence a cooling medium may be circulated through reactor 20 on the shell side in order to remove the exothermic heat of the reaction. This cooling medium may be water or any other suitable cooling fluid or it may consist of the bottom products from fractionation towers 25 and 46 described below. If desired, the cooling medium may be circulated through the tube section of the reactor, the catalyst being packed in the shell section.

Fractionator 25 which is equipped with reflux means 26 and reboiler means 27 is operated at a pressure of about 100 pounds per square inch and serves to separate the non-alkylated paraffinic components of the $C_4$ hydrocarbons from benzene and alkylated benzene. The paraffinic $C_4$ fraction containing not more than 5.0 per cent and preferably less than 0.3 per cent by weight of non-alkylated $C_4$ olefins is passed overhead from fractionator 25 through line 28. This whole product may be used as feed to a butane isomerization process or the butane fraction may be so used after isobutane is removed therefrom by fractionation in cases wherein the isobutane content is relatively high. If desired, the residual olefins, if any, may be removed by a sulfuric acid wash before passing the paraffinic $C_4$ fraction to isomerization. The use of excess benzene in the alkylation step insures a substantially complete olefin cleanup from the gas stream, and, hence, additional purification of the paraffinic stream in line 28 is usually unnecessary. Unreacted benzene is withdrawn from fractionator 25 as a side stream for recycle to the alkylation step through line 29 which leads to line 11, and the alkyl benzene bottom product is withdrawn through line 30.

While reactor 20 is being utilized for the alkylation cycle, reactors 40 and 60 are on stream for the dealkylation and catalyst regeneration cycles, respectively. Alkylated benzene in line 30 is passed to line 32 and thence to the shell side of reactor 60 where the product picks up heat supplied by the regeneration of catalyst in the tube section of reactor 60 thereby aiding in the control of the temperature of regeneration of the catalyst. If desired, a part of the alkyl benzene product may be diverted through valved line 33 to the shell side of alkylation reactor 20 in order to remove the exothermic heat of alkylation. This preheated stream passes from reactor 20 through lines 34 and 35 to furnace 36 for final heating prior to conversion in reactor 40. Preheated alkyl benzene passes from the shell section of regenerator 60 via line 37 which connects with line 34 leading to furnace 36.

In furnace 36 the alkylated product is brought to a temperature within the range of from 350° C. to 550° C. preferably from 475° C. to 525° C. This product is then passed as a vapor through lines 38 and 39 to the catalyst packed tubes of reactor 40 which has been previously on stream for the alkylation cycle. Reactant vapors pass upward through the tubes of reactor 40 at a space velocity (liquid basis) within the range of from about 5 to 20 volumes of reactant per volume of catalyst space per hour and at a pressure of about 20 to 30 pounds gage. The product vapors pass from reactor 40 through line 41 which connects with line 42 leading to condenser 43. If desired, the reaction product from reactor 40 may be precooled before passing to condenser 43 by heat exchange with alkylation feed or with dealkylation feed prior to final heating of said dealkylation feed in furnace 36. The liquefied product is picked up by pump 44 and is passed via line 45 to fractionator 46.

As stated hereinabove, I prefer to operate the dealkylation cycle to obtain less than 75% conversion, and, hence, the dealkylate product will contain olefins, predominantly butenes, benzene and non-converted alkyl benzenes. Fractionator 46, which is operated at a pressure of about 100 pounds per square inch, is equipped with suitable reflux means 47 and reboiler means 48. The olefin fraction is taken overhead through line 49 and recycle benzene is either recovered as a side stream through line 62 or is recycled through line 50 which connects with process feed line 11. The bottom product from fractionator 46 which contains unconverted alkyl benzene with a small amount of olefin polymer is withdrawn through line 51 which connects with line 32 and the stream after receiving preheat in catalyst regenerator 60 and final heat pick up in the furnace 36 is recycled to reactor 40.

During at least a part of the period when reactors 20 and 40 are being utilized for the alkylation and dealkylation cycles, the catalyst in reactor 60, which reactor has been removed from operation on a previous dealkylation cycle, and, therefore, contains carbon-deactivated catalyst, is being subjected to oxidative regeneration. The tendency for carbon to collect on the catalyst in either the alkylation or dealkylation cycles is not pronounced, and, hence, the sum of the cycle periods for these two operations will be relatively long compared to the time required for regeneration of the catalyst. Thus, for example, I may operate my process by using reactor 20, the catalyst in which has been freshly regenerated, for the alkylation step. Reactor 40 is then on the dealkylation cycle having been shifted thereto from the alkylation cycle without an intermediate regeneration, and the catalyst bed in reactor 60, freshly regenerated on a relatively short cycle and cooled as described hereinbelow, is standing by ready for use on the alkylation cycle. After the catalyst in reactor 20 is partially spent the alkylation feed stream in line 16 is diverted through line 52 to reactor 60, preheated alkylate in line 38 is sent to reactor 20, and the catalyst in reactor 40 is put on the regeneration cycle. When changing the flow of reactants to different towers suitable adjustment of valves in lines 32, 33, and 54 are made to redirect the flow of alkylate from fractionator 25 and recycle from fractionator 46 to the shell side of the appropriate reactors for the pickup of preheat from the exothermic alkylation and regeneration cycles.

The inequality of time requirement for the conversion cycles and the regeneration cycle permits a unique sequence of operations which aids in the reduction of heat duty for furnace 36. Thus, as an alternate method of supplying heat to the endothermic dealkylation reaction zone, I may operate my process in the following manner. When the catalyst in reactor 20 which is on stream for alkylation begins to show loss of activity, I permit the temperature of the catalyst bed to rise as much as 75° or 100° C. above the alkylation temperature ranges described hereinabove. This is accomplished by reducing or eliminating entirely the withdrawal of the exothermic heat of reaction by coolants on the shell side of the reactor. Product from reactor 20 is then directed through cooler 56 in line 57 which connects with manifold alkylation feed line 16 whence the product is directed to freshly regenerated catalyst in reactor 60 where the alkylation is completed at a lower temperature and lower pressure as described hereinbelow.

The two stage alkylated product is passed from reactor 60 through line 59 which connects with manifold alkylate product line 61 which in turn joins line 21. If desired, the ratio of benzene to butene in the alkylation feed may be increased during this period in order to compensate for reduced alkylation due to lower catalyst activity and unfavorably high temperatures in reactor 20. Excess benzene may be withdrawn from the system through trapout line 62, leading from fractionator 46. Thus, in the succeeding cycle when the catalyst in reactor 40 is more completely spent the dealkylation feed in line 38 is directed to the heated catalyst in reactor 20, alkylation feed is sent directly to reactor 60 and reactor 40 is put on the regeneration cycle.

When operating according to the above procedure, that is, at abnormally high temperature in the alkylation zone, the reaction may be more completely directed toward alkylation by adjustment of the relative amount of aromatic hydrocarbons to olefin hydrocarbons in the alkylation feed and/or by adjustment of the pressure in the alkylation reactor. Thus, for example, the ratio of aromatics to olefins in the alkylation feed may be raised when operating in the higher temperature range from 3 or 5 to 1 to a ratio as high as 9 or 10 to 1. A second method, collaterally or alternately used for increasing the alkylation under high temperature operation consists of allowing the pressure to build up in reactor 20 from a normal operating pressure of 200 or 300 pounds per square inch to a pressure of 700 or 800 pounds or even 1500 pounds per square inch. Thus, although the temperature in this type of operation is above the most efficient level for conventional moderate pressure and lower aromatic to olefin ratio alkylation procedure, alkylation will predominate rather than dealkylation because of the above described adjustment of pressure and the relatively high aromatic to olefin ratio.

The catalyst in reactor 40 is regenerated by burning off the deposited carbon by means of a gas containing free oxygen such as a mixture of air and flue gas. It is necessary to control the oxidation in order to prevent the temperature of the catalyst undergoing reactivation from rising above 650° C. and preferably the temperature of the catalyst should not be allowed to exceed about 600° C. during the catalyst regeneration period. Hence, air, diluted with from 2 to 20 parts of an inert gas such as flue gas is introduced to the catalyst in reactor 40 through manifold line 63 and line 64. The oxygen in the gaseous mixture combines with the deposited carbon to form carbon dioxide and carbon monoxide, and the catalyst is thereby regenerated to its original activity. The regenerator gas passes from reactor 40 through line 65 which connects with manifold line 66 through which the gas passes from the system. If desired, at least a part of the effluent gas from reactor 40 may be recycled as a diluent gas for the oxygen containing regenerator feed by passing a part of the gas from line 66 through valved line 67 and cooler 68. Cooler 68 may be substituted by an indirect heat exchanger such as heater 14, thereby utilizing a part of the sensible heat of the flue gas as preheat for alkylation charge stock.

Following the regeneration of the catalyst in reactor 40 the flow of cold flue gas is continued for sufficient time to lower the temperature of the catalyst to the approximate required alkylation temperatures, assuming that the freshly regenerated catalyst is to be used immediately for the alkylation cycle. If the reactor is to be used in the succeeding cycle for dealkylating the product in line 51, cooling of the bed will be unnecessary. In any case, the catalyst in reactor 40 should be purged with an inert gas such as flue gas to remove all traces of free oxygen before inauguration of either of the hydrocarbon conversion cycles. The reactor should also be purged with flue gas prior to the regeneration cycle in order to remove hydrocarbon vapors from the reactor before introduction of free oxygen containing gas in the regeneration cycle. Alternately, steam may be used to purge the spent catalyst before regeneration and/or after regeneration before being subjected to the above hydrocarbon conversion cycles.

Although I have described one embodiment of the invention wherein stationary beds of catalyst are used in the three cycles of operation, I do not wish to be limited to stationary bed type operation. The process may be carried out very readily using moving beds of catalyst such as are used in the Thermofor catalytic conversion processes, the catalyst being moved continuously from the alkylation zone to the dealkylation zone and thence to regeneration whence it would be recycled to the alkylation zone. The process can also be carried out in hindered flow type operation utilizing powdered catalyst or combinations of these different methods of operating catalytic conversions may be used in the different steps or cycles.

As pointed out hereinabove, the separation of a pure stream of olefins from paraffins which boil in the same temperature range is extremely difficult if not impossible. Thus, for example, a mixture of $C_4$ hydrocarbons obtainable from petroleum cracked gases may contain:

|  | °C. |
|---|---|
| Isobutane, boiling point | −11.7 |
| Isobutylene, boiling point | −6.9 |
| Butene-1, boiling point | −6.3 |
| n-Butane, boiling point | −.6 |
| Butene-2, (trans) boiling point | .86 |
| Butene-2, (cis) boiling point | 3.64 |

The separation of these $C_4$ hydrocarbons in a reasonable degree of purity by distillative fractionation is impossible. However, by the hereinabove described process the normal butane and isobutane may be recovered as a relatively pure paraffinic mixture as overhead from fractionator 25 and the normal butane may then be separated from the isobutane by simple distillative fractionation. The olefins of the mixture are recovered as overhead from fractionator 46, and this mixture is subjected to fractionation to obtain an isobutylene-butene-1 cut and a butene-2 cut, the latter serving as ideal feed to a dehydrogenation process for the production of butadiene. The isobutylene can be separated from the butene-1 by absorption in 65% $H_2SO_4$ from which it may be recovered as a pure isobutylene feed to a $BF_3$ catalyzed polymerization process or other catalytic process for the production of high molecular weight polymers. The butene-1 may be used in the production of intermediates for the manufacture of various chemicals.

My process is likewise adaptable for the isolation of relatively pure olefin streams from a $C_3$ or $C_5$ fraction of petroleum cracked gases.

While I have shown and described the preferred embodiment of my invention, I wish it to be understood that I do not confine myself to the precise details herein set forth by way of illustration, as it is apparent that many changes may be made therein by those skilled in the art, without departing from the spirit of the invention, or exceeding the scope of the appended claim.

I claim:

A process for the separation of olefins of from 3 to 5 carbon atoms from close-boiling paraffins and for separately recovering said olefins and said paraffins which comprises the steps of: (1) admixing a molar excess of benzene on the basis of the olefin charged with the paraffin-olefin mixture and subjecting the feed mixture so obtained to a pre-alkylation step by contacting with an alumina-silica catalyst in a first zone at a temperature above 300° C. and at a pressure of from about 700 to about 1500 pounds per square inch while permitting the temperature within said first zone to rise due to the exothermic heat of reaction, (2) cooling the gaseous effluent from step 1 below 300° C. and subjecting it to a final alkylation step by contacting with an alumina-silica catalyst in a second zone while maintaining a temperature of from 175° C. to 300° C. and a pressure of less than about 300 pounds per square inch, (3) fractionating the effluent from step 2 to obtain a paraffin stream, and unreacted benzene stream and an alkyl benzene stream (4) subjecting the alkyl benzene to a dealkylation step by contacting it with an alumina-silica catalyst in a third zone maintained at a temperature above 350° C., (5) fractionating the effluent from step 4 to obtain an olefin stream, a benzene stream and an unreacted alkyl benzene stream, (6) recycling the unreacted alkyl benzene stream from step 5 to step 4 and the benzene streams from steps 3 and 5 to step 1, (7) separately recovering the paraffin stream and the olefin stream, (8) when the temperature in the first zone has risen to about 450° C., transferring the dealkylation step to the first zone, passing the feed mixture directly to the final alkylation step in the second zone and regenerating the catalyst in the third zone to prepare it for reuse as an alkylation catalyst, and (9) when the catalyst has been regenerated, placing it in use in carrying out the final alkylation step and raising the pressure of the reactants in the second zone to make the operations therein the pre-alkylation step and permitting the temperature to rise to repeat the cycle.

ALEX G. OBLAD.

REFERENCES CITED

The following references are of record in the file of this patent:

UNITED STATES PATENTS

| Number | Name | Date |
| --- | --- | --- |
| 1,953,702 | Davidson | Apr. 3, 1934 |
| 2,222,632 | Sachanen et al. | Nov. 26, 1940 |
| 2,242,960 | Sachanen et al. | May 20, 1941 |
| 2,295,608 | Ruthruff | Sept. 15, 1942 |
| 2,360,358 | Mattox | Oct. 17, 1944 |
| 2,370,810 | Morrell et al. | Mar. 6, 1945 |
| 2,381,175 | Mattox | Aug. 7, 1945 |
| 2,382,505 | Schulze | Aug. 14, 1945 |

FOREIGN PATENTS

| Number | Country | Date |
| --- | --- | --- |
| 456,637 | Great Britain | Nov. 12, 1936 |

OTHER REFERENCES

Babor and Lehrman, General College Chemistry, pages 80–81, 1940, published by T. Y. Crowell Co.

Thomas et al., "Hydrocarbon Reactions—IV. Removal of Side Chains from Aromatics," J. A. C. S. 66, 1694–5–6, October 1944.

"Ethyl Benzene—Outlet," Oil and Gas Journal, August 6, 1942, pages 14 and 15.